United States Patent [19]

Hirama et al.

[11] Patent Number: 5,027,821
[45] Date of Patent: Jul. 2, 1991

[54] ULTRASONIC IMAGING APPARATUS

[75] Inventors: Makoto Hirama; Hironobu Hongo, both of Ootawara, Japan

[73] Assignee: Kabushiki Kaisha Toshiba, Kawasaki, Japan

[21] Appl. No.: 365,393

[22] Filed: Jun. 13, 1989

[30] Foreign Application Priority Data

Jun. 17, 1988 [JP] Japan .................................. 63-148249
Jul. 15, 1988 [JP] Japan .................................. 63-176706

[51] Int. Cl.$^5$ .............................................. A61B 8/00
[52] U.S. Cl. .................... 128/661.01; 73/625
[58] Field of Search ............... 128/660.07, 661.01; 73/625–626

[56] References Cited

U.S. PATENT DOCUMENTS

| | | | |
|---|---|---|---|
| 4,603,586 | 8/1986 | Iida | 73/626 |
| 4,611,494 | 9/1986 | Uchiyama | 73/626 |
| 4,622,634 | 11/1986 | Fidel | 73/626 X |
| 4,674,516 | 6/1987 | Hirota et al. | 73/626 X |
| 4,679,176 | 7/1987 | Ogawa et al. | 73/626 X |
| 4,699,009 | 10/1987 | Maslak et al. | 73/626 |
| 4,716,765 | 1/1988 | Hirama | |
| 4,790,320 | 12/1988 | Perten et al. | 73/626 X |

OTHER PUBLICATIONS

U.S. patent application Ser. No. 07/246,105, Hirama et al.

Primary Examiner—Francis Jaworski
Attorney, Agent, or Firm—Finnegan, Henderson, Farabow, Garrett and Dunner

[57] ABSTRACT

In the ultrasonic imaging apparatus according to the present invention, ultrasonic transducers provided in a probe for corresponding channels are driven and caused to propagate ultrasonic waves by a standard signal generating circuit, transmission delay circuits and pulsers. Then, receiving signals obtained from the ultrasonic transducers are delayed in an analog manner by analog delay circuits. The resulting delayed signals are A/D converted by analog/digital converters. The outputs of the A/D converters are delayed in a digital manner by digital delay circuits composed of semiconductor memory elements. The resulting delayed outputs are summed by a summing circuit. The output of the summing circuit is detected. Predetermined imaging data is produced based on the detected output and displayed. In order to enhance delay precision of the analog/digital converters and digital delay circuits, the delay amount of the analog delay circuits can be continuously varied in small steps.

9 Claims, 9 Drawing Sheets

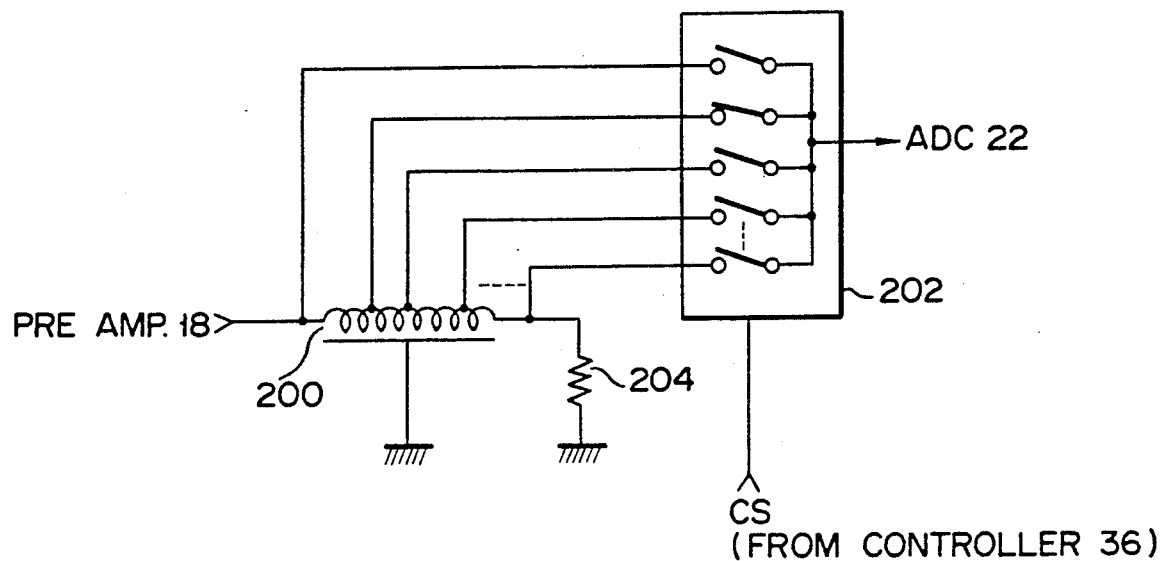
F I G. 2
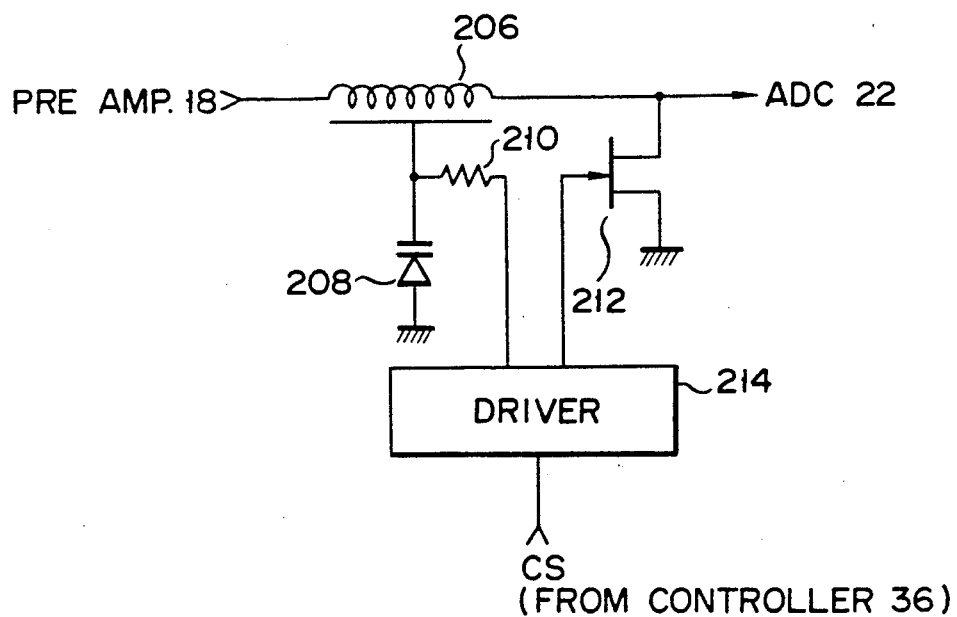
F I G. 3

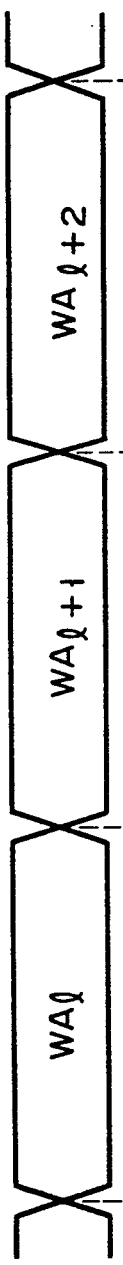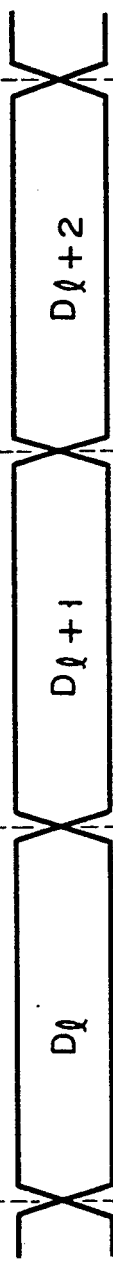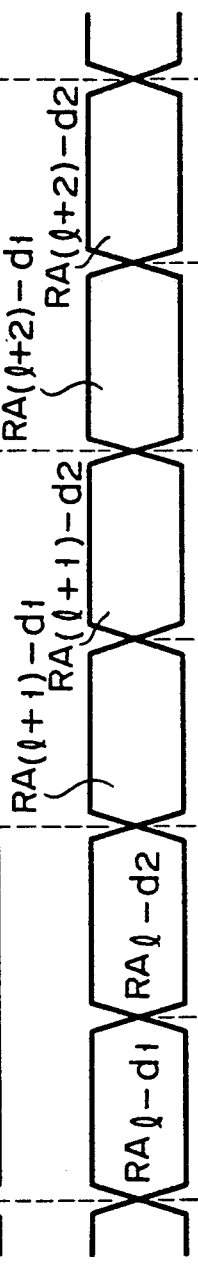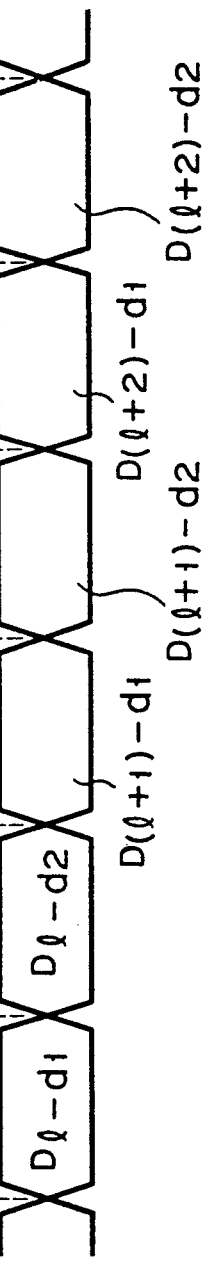
FIG. 5A WRITE ADDRESS
FIG. 5B WRITE DATA
FIG. 5C READ ADDRESS
FIG. 5D READ DATA

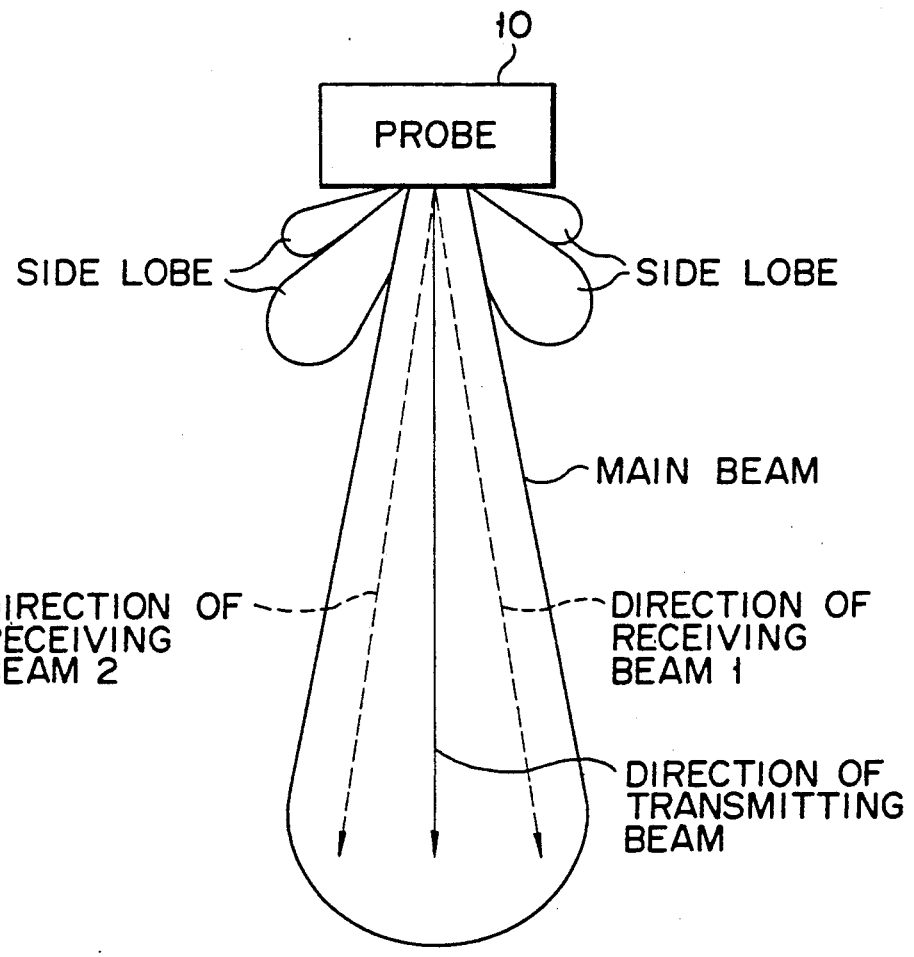
F I G. 6

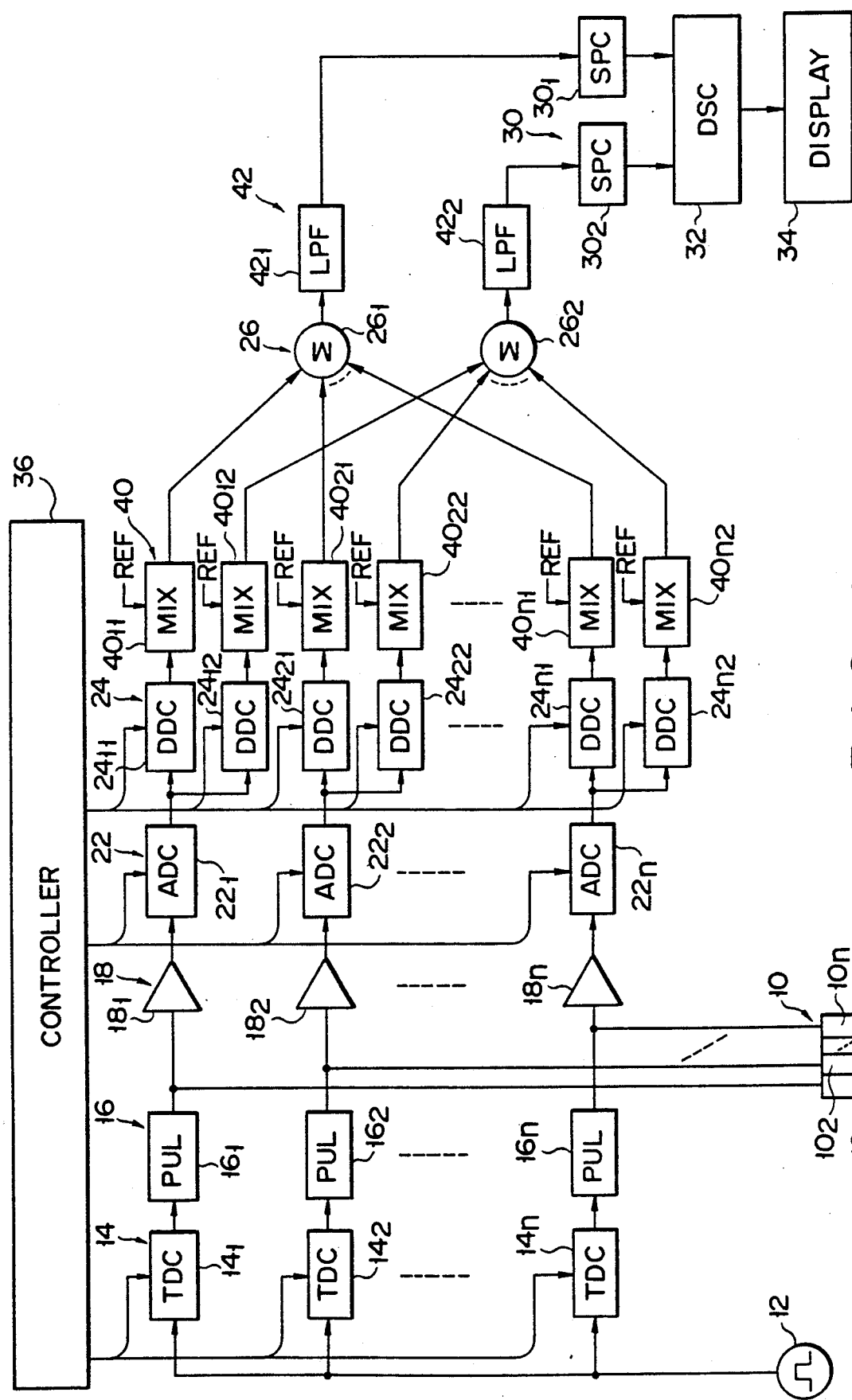
F I G. 8

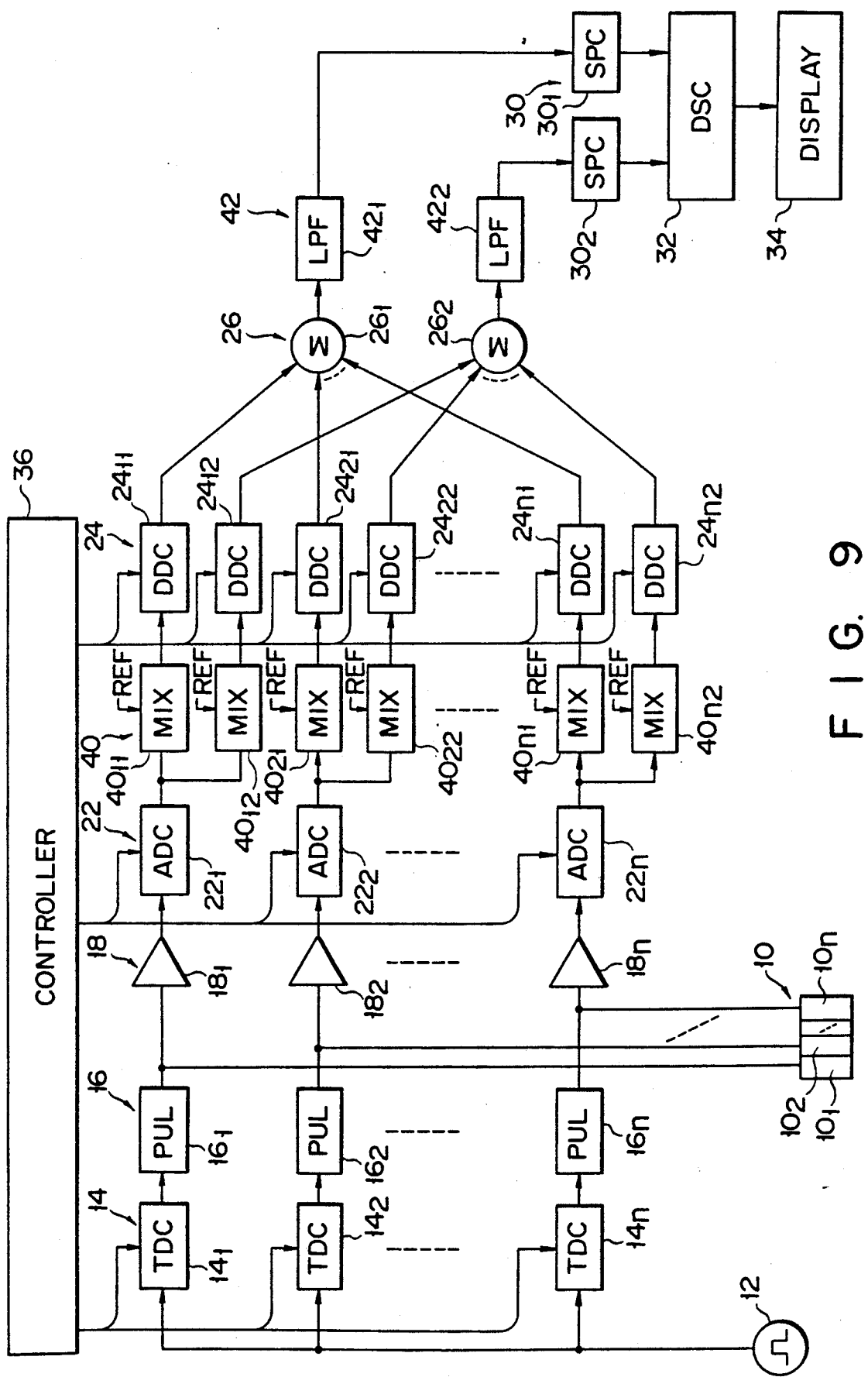
F I G. 9

ULTRASONIC IMAGING APPARATUS

BACKGROUND OF THE INVENTION

1. Field of the Invention

The present invention relates to an ultrasonic imaging apparatus such as an ultrasound diagnostic apparatus for medical treatment or an ultrasonic flaw detector for nondestructive testing, wherein an ultrasonic wave is propagated through a living body or a subject to obtain display image data items for ultrasonic diagnosis, such as an M-mode image (motion image), a B-mode image (tomographic image), a bloodstream velocity image, a CFM image (color flow mapping image), etc.

2. Description of the Related Art

This type of ultrasonic imaging apparatus has some problems to be solved.

One of the problems is that the receiving delay quantization precision is low. In other words, a receiving echo signal produced by each ultrasonic transducer element includes components of various frequencies and has a wide dynamic range. Thus, in the receiving delay processing for beam deflection or beam focusing in a receiving system, each receiving echo signal supplied from each element needs to be subjected to a receiving delay in steps of about 10 nsec.

It is possible to perform this receiving delay processing in a digital manner, by connecting an A/D converter to each of simultaneous receiving elements, directly A/D converting a receiving echo obtained from each element, using a shift-register or the like as a digital delay circuit formed of a semiconductor memory element, and controlling the data readout time in steps of 10 nsec.

However, the quantization precision of delay is determined by the conversion rate of the A/D converter. Thus, in order to achieve the quantization precision of delay of 10 nsec, it is necessary to provide the same number of A/D converters functioning by conversion clocks of 1/10 nsec = 100 MHz as the number of simultaneous receiving elements. The provision of such A/D converters involves high costs, and power consumption is high. Thus, it is very difficult to manufacture an ultrasonic imaging apparatus by using such A/D converters. On the other hand, if inexpensive A/D converters having a low conversion rate (e.g., 50 nsec) are used, the resolution of the apparatus would be degraded, and artifacts increase. The use of these inexpensive A/D converters is also unpractical.

Under these circumstances, an analog delay circuit (analog delay line) comprising a coil inductance L and a capacitance C is generally used for receiving delay processing, and a precision of delay time of about 10 nsec is maintained.

The analog receiving delay processing using the above analog delay circuit has the following drawbacks: undesirable frequency characteristic, artifact due to crosstalk, disturbance of signal waveform due to reflection, variation in delay time, etc.

Owing to these drawbacks, imaging data for B-mode images or the like is deteriorated.

Another desirable goal is to obtain a fine ultrasonic image by increasing the number of scanning lines, and to improve the real time characteristic by increasing the number of frames without changing the number of scanning lines.

As a technique solving this problem, a multidirection simultaneous receiving system has been proposed, which comprises a plurality of receiving delay circuits, and a plurality of summing circuits and receivers corresponding to the receiving delay circuits. Ultrasonic beams having a plurality of receiving directivities are received by a single probe.

In this system, if the analog delay circuits are used for the above-stated reason, it becomes impossible to simultaneously set a plurality of receiving directivities. Under these circumstances, it is necessary to provide the same number of receiving delay systems as the number of simultaneous receiving directivities, resulting in increase in circuit scale of the apparatus.

SUMMARY OF THE INVENTION

The object of the present invention is to provide an ultrasonic imaging apparatus which can enhance the quantization precision of receiving delay, can perform multi-direction simultaneous receiving, and can allow easy manufacturing.

These objects can be achieved by an ultrasonic imaging apparatus comprising:

a probe having a plurality of ultrasonic transducers arranged in a plurality of channels;

transmission means for driving and causing each of said ultrasonic transducers to transmit ultrasonic waves;

analog receiving delay means for continuously delaying receiving signals supplied from said ultrasonic transducers in the respective channels in an analog manner and in small steps;

analog/digital converter means for converting output signals of said analog receiving delay means to digital signals;

digital receiving delay means for delaying the digital signals output from said analog/digital converter means in a digital manner;

summing means for summing the signals supplied from said digital receiving delay means through the respective channels;

imaging means for detecting the output of the summing means, producing predetermined imaging data based on the output of the detector, and displaying the produced imaging data; and control means for controlling at least one of the above-recited means.

According to this ultrasonic imaging apparatus, the analog receiving delay means can continuously vary the delay amount in small steps. Thus, even if the conversion rate of the analog/digital converter means is low, the receiving delay quantization precision can be enhanced, and the use of a plurality of summing circuits can realize multi-directional simultaneous reception.

The objects of the invention can also be achieved by an ultrasonic imaging apparatus, comprising:

a probe having a plurality of ultrasonic transducers arranged in a plurality of channels;

transmission means for driving and causing each of said ultrasonic transducers to transmit ultrasonic waves;

analog/digital converter means for converting receiving signals supplied from said ultrasonic transducers to digital signals;

digital receiving delay means for delaying the output of said analog/digital converter means in a digital manner, each channel of said digital receiving delay means including a plurality of digital delay circuits;

mixing means comprising a plurality of mixers connected to the digital delay circuits of said digital receiving delay means, thereby to produce two outputs which are obtained by displacing the outputs of the digital receiving delay means by $\pi/2$ phase;

a plurality of summing circuits for summing data signals output from the mixing means at a plurality of various timings;

imaging means for filtering the outputs of the summing circuits, producing predetermined image data based on the filtered outputs, and displaying the produced image data; and control means for controlling at least one of the above-recited means.

According to this ultrasonic imaging apparatus, two types of signals can be obtained from one channel of the receiving delay system, and phase matching can be performed. Thus, even if the conversion rate of the analog/digital converter means is low, the receiving delay quantization precision can be enhanced, and the use of a plurality of summing circuits can realize multi-directional simultaneous reception.

The objects of the invention can also be achieved by an ultrasonic imaging apparatus, comprising:

a probe having a plurality of ultrasonic transducers arranged in a plurality of channels;

transmission means for driving and causing each of said ultrasonic transducers to transmit ultrasonic waves;

analog/digital converter means for converting receiving signals supplied from said ultrasonic transducers to digital signals;

mixing means including a plurality of mixers for receiving though each channel an output of the analog/digital converter means, which is divided into two signal components, thereby to produce two outputs which are obtained by displacing the outputs of the digital receiving delay means by $\pi/2$ phase;

digital receiving delay means, including a plurality of digital delay circuits for each channel, for delaying the outputs of the mixing means in a digital manner;

a plurality of summing circuits for summing data signals read out from the digital receiving delay means at a plurality of various timings;

imaging means for filtering the outputs of the summing circuits, producing predetermined image data based on the filtered outputs, and displaying the produced image data; and control means for controlling at least one of the above-recited means.

According to this ultrasonic imaging apparatus, two types of signals can be obtained from one channel of the receiving delay system, and phase matching can be performed. Thus, even if the conversion rate of the analog/digital converter means is low, the receiving delay quantization precision can be enhanced, and the use of a plurality of summing circuits can realize multi-directional simultaneous reception.

BRIEF DESCRIPTION OF THE DRAWINGS

FIG. 2 is a detailed circuit diagram showing an example of an analog delay circuit shown in FIG. 1;

FIG. 3 is a detailed circuit diagram showing another example of the analog delay circuit shown in FIG. 1;

FIGS. 5A to 5D partly show the operation of a controller, wherein FIG. 5A is a timing chart of data write addresses of a digital delay circuit shown in FIG. 4, FIG. 5B is a timing chart of write data corresponding to the write addresses of the digital delay circuit shown in FIG. 4, FIG. 5C is a timing chart of data read addresses of the digital delay circuit shown in FIG. 4, and FIG. 5D is a timing chart of data read data corresponding to the read addresses of the digital delay circuit shown in FIG. 4;

FIG. 6 schematically shows a beam employed in a two-directional simultaneous receiving system;

FIG. 8 is a block diagram showing a structure of a medical sector electronic scan type ultrasonic image diagnosis apparatus according to a fourth embodiment of the present invention;

FIG. 9 is a block diagram showing a structure of a medical sector electronic scan type ultrasonic image diagnosis apparatus according to a fifth embodiment of the present invention.

DETAILED DESCRIPTION OF THE PREFERRED EMBODIMENTS

The present invention will now be described in detail with reference to the accompanied drawings. In this description, an ultrasonic imaging apparatus of the present invention is applied to a medical sector electronic scan type ultrasonic imaging apparatus.

Figure 1:
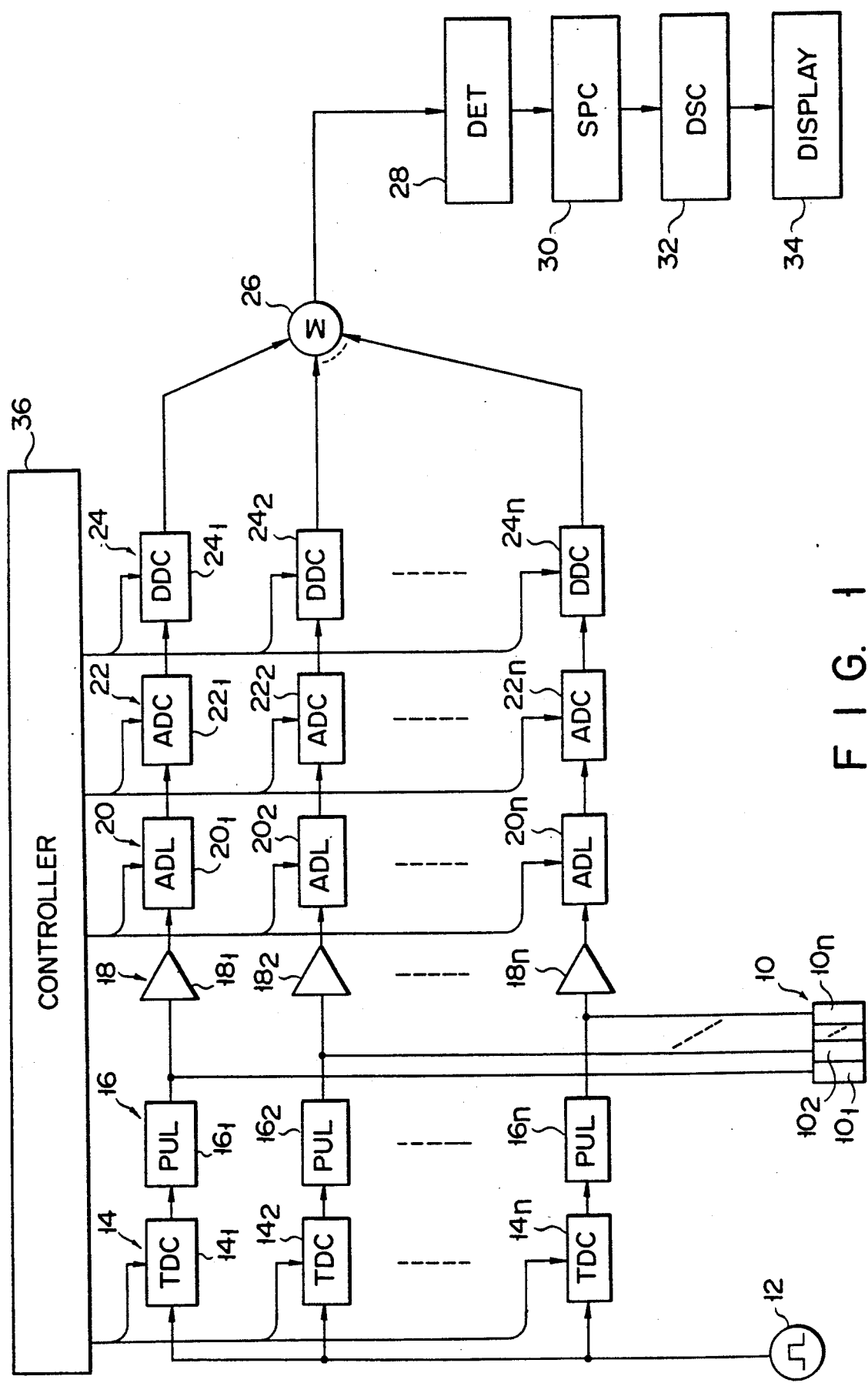
FIG. 1 is a block diagram showing a structure of a medical sector electronic scan type ultrasonic image diagnosis apparatus according to a first embodiment of the present invention.

As shown in FIG. 1, a probe 10 has ultrasonic transducers $10_1$, $10_2$... $10_n$, which are arrayed for suitable electronic scanning. The ultrasonic transducers $10_1$ to $10_n$ transmit/receive ultrasonic waves to/from corresponding elements through a transmission system and a receiving system (described later).

By the transmission operation of the transducers, n-channel receiving signals are supplied to a receiving system. In the receiving system, analog receiving delay processing, analog/digital conversion processing, and digital receiving delay processing are executed for each channel, and the outputs of the respective channels are added, and supplied to an imaging system.

In the imaging system, the added output is processed to produce one or more of ultrasonic images such as an M-mode image, a B-mode image, a bloodstream velocity image and an CFM image, and the produced image is displayed in real time.

A transmission system comprises at least a standard signal generator 12, a transmission delay section 14 consisting of an n-number of transmission delay circuits $14_1$ to $14_n$, and a pulser section 16 consisting of an n-number of pulsers $16_1$ to $16_n$. The transmission system performs transmission delay processing for the n-channels.

Transmission delay times tl to tn, generated from the transmission delay section 14 are normally set to about 10 nsec. Since it is sufficient to supply two-value electric pulses to the probe 10, the transmission delay section 14 can be easily formed by digital circuits, and high-precision transmission delay control is possible.

The receiving system comprises at least a preamplifier 18, an analog receiving delay section 20, an A/D converter 22, a digital receiving delay section 24, and a summing section 26.

The preamplifier 18 consists of an n-number of pre-amplifiers $18_l$ to $18_n$. The analog receiving delay section 20 consists of an analog receiving delay circuits (analog delay lines) $20_l$ to $20_n$. The A/D converter section 22 consists of an n-number of A/D converters $22_l$ to $22_n$. The digital receiving delay section 24 consists of an n-number of digital receiving delay circuits (registers formed of semiconductor memory elements such as random access memories (RAM) $24_l$ to $24_n$. The summing section 26 comprises a single summing circuit 26.

In the receiving system, analog receiving delay processing, analog/digital conversion processing, and digital receiving delay processing are executed for n-channels, and the outputs of the respective channels can be added.

The imaging system comprises at least a detector 28, a signal processor 30, a digital scan converter 32 and a display 34.

The detector 28 is of the orthogonal phase detection type. The signal processor 30, for example, subjects each ultrasonic raster data item to signal processing necessary for ultrasonic image production. The digital scan converter 32 converts the ultrasonic scan of ultrasonic images produced by the signal processor 30 to, for example, a standard television scan. The display 34 displays the scan-converted ultrasonic image in real time, for example, by the standard television scan system.

The controller 36 supplies control signals, at least, to the transmission delay section 14, the pulser section 16, the analog receiving delay section 20, the A/D converter section 22 and the digital receiving delay section 24. Namely, the controller 36 supplies, to the transmission delay section 14, delay time control signals for enabling transmission beam deflection and focusing to be made for each channel. The controller 36 supplies drive control signals to the element of the pulser section 26 in each channel. Also, the controller 36 delivers sample/hold timing signals and conversion timing signals to the A/D converter section 22.

The analog receiving delay section 20 varies the delay time of echo signals continuously in small steps. The analog receiving section 20, in combination with the digital receiving delay section 24, produces receiving delay times rl to rn having a pattern reverse to that of the transmission delay times tl to ln produced by the transmission delay section 14.

FIG. 2 shows a circuit for one channel of a tap type analog delay circuit, and FIG. 3 shows a circuit for one channel of a continuously variable analog delay circuit.

In the tap type analog delay circuit shown in FIG. 2, a coil 200 is provided with a plurality of taps. A switch device 202 has a plurality of switches corresponding to the taps. One end of the coil 200 is connected to a ground through a resistor 204.

The other end of the coil 200 is supplied with a receiving signal output from a pre-amplifier 18. By operating the switches of the switch 202, signals which have been delayed in small steps are produced from output terminals of the switch 202 and supplied to the A/D converter (ADC) 22.

FIG. 3 shows a continuously variable analog delay circuit comprising a coil 206, a variable-capacitance diode 208, a resistor 210, a field-effect transistor (FET) 212 and a driver 214. The driver 214 continuously changes the capacitance of the variable-capacitance diode 208, and a delay time is determined by an LC constant given by the diode 208 and the coil 206.

In this case, the characteristic impedance of a delay line is varied by the value of capacitance C. Thus, an FET 212 is provided as a matching resistor, and the resistance value of the FET 212 is changed along with the value of capacitance C, thus matching the inductance L of the coil 206, resistance R of the FET 212, and capacitance C of the diode 208.

In the above-described analog delay circuits, the echo signals received by the elements 101 to $10_n$ are delayed in steps of 10 nsec (up to a maximum of 40 nsec).

The operation of the above apparatus will now be described. The reference signal generator 12, transmission delay section 14, and pulser section 16 are driven by the operation of the controller 36. Transmission pulses having different delay times tl to tn are supplied to the elements $10_l$ to $10_n$ of the probe 10.

Then, the elements of $10_l$ to $10_n$ of the probe 10 produce ultrasonic waves with time delays tl to tn. The wavefronts of the ultrasonic waves are synthesized, and ultrasonic beams are propagated to a target (not shown). The ultrasonic beams are reflected from the object, and resulting echo signals are input to the elements $10_l$ to $10_n$ of the probe 10.

The echo signals are amplified by the preamplifiers $18_l$ to $18_n$ of the preamplifier section 18. The amplified signals are delayed by the analog delay circuits $20_l$ to $20_n$ of the analog receiving delay section 20 which have received receiving delay control signals from the controller 36. The delayed signals flowing through the respective channels are converted to digital signals by the A/D converters $22_l$ to $22_n$ of the A/D converter 22. The resulting digital signals are further delayed by the digital receiving delay circuits $24_l$ to $24_n$ of the digital receiving delay section 24.

As a result, the pattern of transmission delay times ti to tn provided by the transmission delay section 14 is made to be reverse to the pattern of receiving delay times rl to r provided by the analog receiving delay section 20 and the digital receiving delay section 24. The digital signals delayed by the digital receiving delay section 24 are synthesized by the summing circuit 26.

In the case where the analog receiving delay section 20 performs phase matching with delay precision of 10 nsec and the digital receiving delay section 24 performs phase matching with delay precision of 50 nsec, it is sufficient that the A/D converter section 22 carries out sampling with a conversion clock of 20 MHz=1/50 nsec. In other words, it is sufficient to perform phase matching with a receiving delay precision of 10 nsec in the entire receiving system, namely, to achieve the quantization precision of receiving delay of 10 nsec by using the A/D converter section 22 having a conversion rate of 20 MHz.

As described above, in the present embodiment, the analog receiving delay section 20 is provided at the front stage of the digital receiving delay section 24. Thus, delay times can be continuously varied in small steps by the analog receiving delay section 20.

As a result, even if the conversion rate of the A/D converter section 22, which is provided at the rear stage of the analog receiving delay section, is low, the delay time precision can be enhanced, and the suitable phase matching can be achieved. Since the analog receiving delay section 20 can provide very short delay times, it can produce delayed signals having excellent characteristics. In addition, the digital receiving delay section 24, which is connected at the rear stage of the A/D converter section 22, is composed of digital circuits such as RAMs, the signals input to the A/D converter section 22 are not degraded, and, therefore, excellent ultrasonic images can be obtained.

The apparatus of the first embodiment is designed for one-directional reception. In the case of multi-directional simultaneous reception, echo signals are stored in the digital receiving delay section 24. By controlling readout timing, a plurality of delay time patterns can be set.

Figure 4:
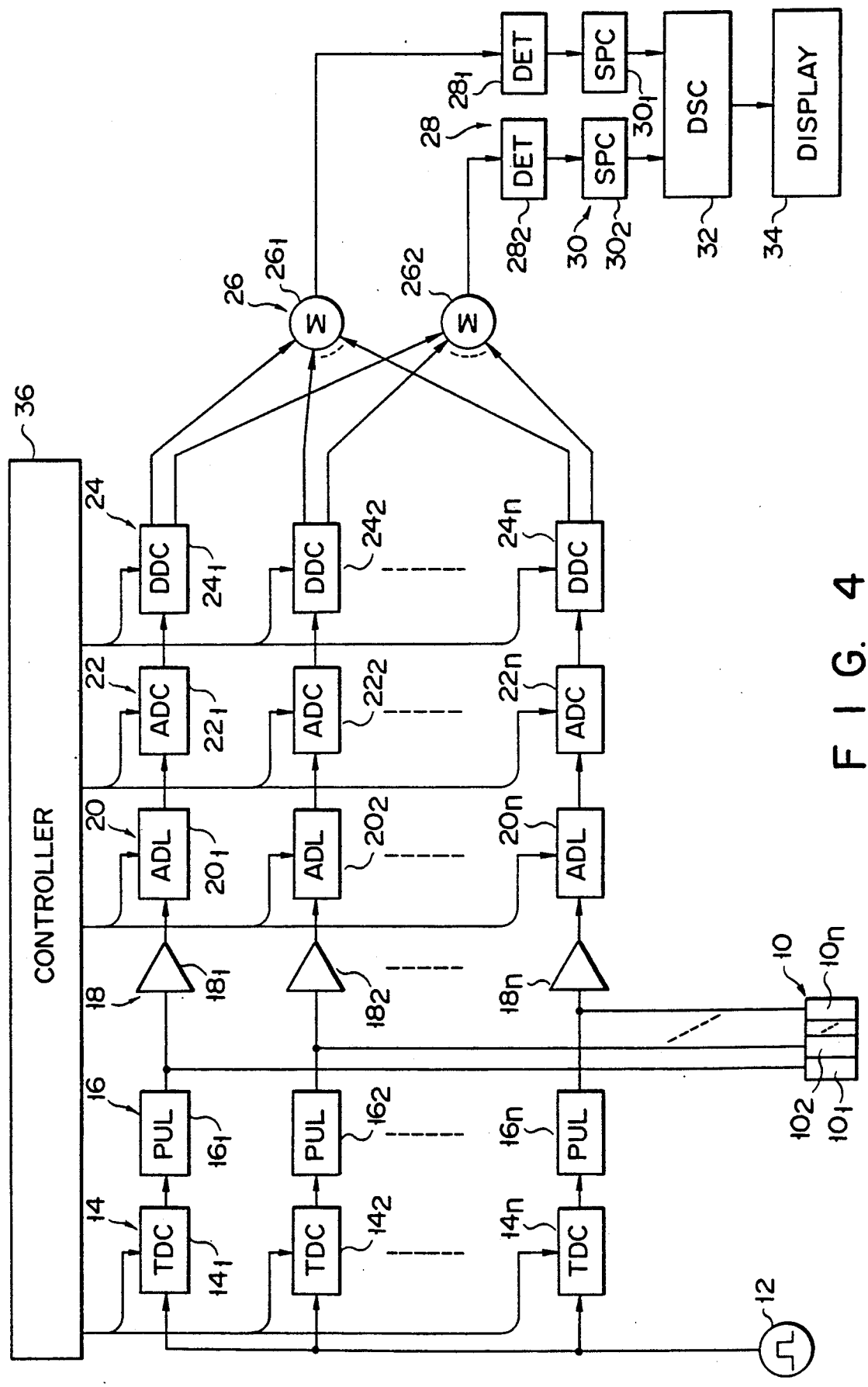
FIG. 4 is a block diagram showing a structure of a medical sector electronic scan type ultrasonic image diagnosis apparatus according to a second embodiment of the present invention.

FIG. 4 shows a medical sector electronic scan type ultrasonic image diagnosis apparatus according to a second embodiment of the invention, which is designed for two-directional simultaneous reception.

The second embodiment differs from the first embodiment in that the former includes two summing circuits $26_1$ and $26_2$, two detectors $28_1$ and $28_2$ and signal processors $30_1$ and $30_2$, whereby the digital receiving delay section 24 is controlled by the controller 36 so that the readout timing of the digital receiving delay section 24 can be effected based two delay time patterns.

According to the second embodiment shown in FIG. 4, the two-directional reception can be realized with a simple structure, and the number of scanning lines and the number of frames can easily be increased.

FIGS. 5A to 5D are timing charts showing timings at which the controller 36 controls the digital receiving delay section 24. In the timing charts, symbol "l" denotes a data number. Symbol "WAl" denotes an l-th data write address, "D" an l-th data item, "DAl" an l-th data readout address, "d1" a delay time for setting the receiving directivity to receiving direction 1, and "d2" a delay time for setting the receiving directivity to receiving direction 2.

FIG. 6 illustrates the two-directional simultaneous reception process.

Figure 7:
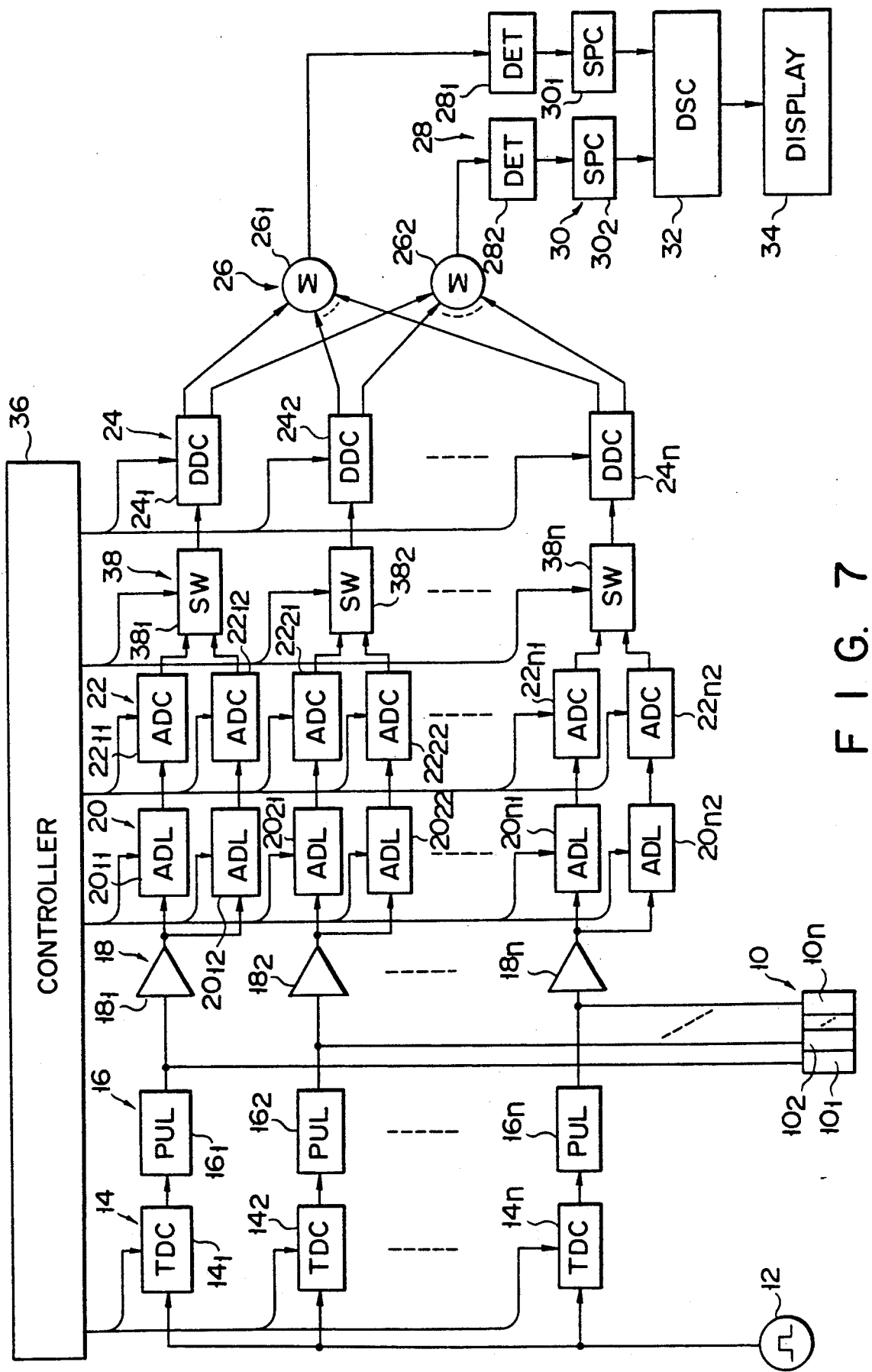
FIG. 7 is a block diagram showing a structure of a medical sector electronic scan type ultrasonic image diagnosis apparatus according to a third embodiment of the present invention.

FIG. 7 shows a medical sector electronic scan type ultrasonic image diagnosis apparatus according to a third embodiment of the present invention, which is designed for two-directional simultaneous reception. The apparatus of the third embodiment is an improvement of the apparatus of the second embodiment shown in FIG. 4.

In FIG. 7, the analog receiving delay section 20 includes analog delay circuits $20_{l1}$ to $20_{nl}$ for analog delay processing in the receiving direction 1, and analog delay circuits $20_{l2}$ to $20_{n2}$ for analog delay processing in the receiving direction 2.

The analog/digital converter 22 includes A/D converters $22_{l1}$ to $22_{nl}$ for A/D conversion processing in the receiving direction 1, and A/D converters $22_{l2}$ to $22_{n2}$ for A/D conversion processing in the receiving direction 2.

The apparatus of the third embodiment also includes a switch section 38 consisting of switches $38_l$ to $38_n$ for selectively supplying the signals fed from the two systems for processing in the two directions 1 and 2 to the digital delay circuits $24_l$ to $24_n$ of the digital receiving delay section 24.

According to the third embodiment, the receiving signals supplied in the two receiving directions 1 and 2 are subjected to high-precision analog delay processing and analog/digital conversion processing, whereby the quality of obtained images can be enhanced.

FIG. 8 shows a fourth embodiment of the invention, which is a modification of the second and third embodiments.

In FIG. 8, the receiving system comprises the preamplifier section 18, the analog/digital conversion section 22, the digital receiving delay section 24, a mixer section 40, the summing section 26, and a low-pass filter section 42. The mixer section 40 and low-pass filter section 42 substantially constitute a detection section.

The preamplifier section 18 consists of an n-number of preamplifiers $18_l$ to $18_n$. The digital receiving delay section 24 includes an n-number of digital receiving delay circuits $24_{l1}$ to $24_{nl}$ for processing of real-number parts, and an n-number of digital receiving delay circuits $24_{l2}$ to $24_{n2}$ for processing of imaginary-number parts. The mixer section 40 includes an n-number of mixers $40_{l1}$ to $40_{nl}$ and an n-number of mixers $40_{l2}$ to $40_{n2}$, which receives reference signals whose phases are displaced by $\pi/2$ and produce real-number part signals and imaginary-number part signals of different phases. The summing section 26 comprises a summing circuit $26_1$ for adding the real-number part signals and a summing circuit $26_2$ for adding the imaginary-number part signals. The low-pass filter section 42 comprises two low-pass filters $42_1$ and $42_2$ for eliminating high-frequency components from the outputs of the summing circuits $26_1$ and $26_2$.

The mixers of the mixer section 40 for mixing the real-number parts and imaginary-number parts of the respective channels are supplied with reference signals whose phases are displaced by $\pi/2$. Thus, real-number part signals and imaginary-number part signals equivalent to those obtained by phase detection can be obtained.

According to the structure shown in FIG. 8, by using reference signals having different phases, real-number part signals and imaginary-number part signals having different phases can be obtained for the respective channels, and also corresponding phase-summed outputs can be obtained. Since phase matching of a level higher than the level of A/D conversion rate of the A/D conversion section 22 can be achieved, high-resolution, low-artifact ultrasonic images can be obtained. Also, reception focusing can be effected at each point of reproduced images, high-resolution images can be obtained.

FIG. 9 shows a fifth embodiment of the invention. The fifth embodiment differs from the fourth embodiment of FIG. 8 in that the mixer section 40 is arranged at the front stage of the digital receiving delay section 24. The function of the fifth embodiment is similar to that of the fourth embodiment.

It is well known that produced images are adversely affected by variation in capacitance between respective channels due to actual mounting of transducers in the probe 10, variation in characteristics between respective channels due to analog signal processing, etc.

Signal processing includes analog processing and digital processing. In particular, an analog processing system comprises signal processing lines for all channels, respectively, and each signal processing line has many elements such as operational amplifiers. Thus, off-set errors appear due to temperature drift, resulting in variation in characteristics of the respective channels.

Figure 10:
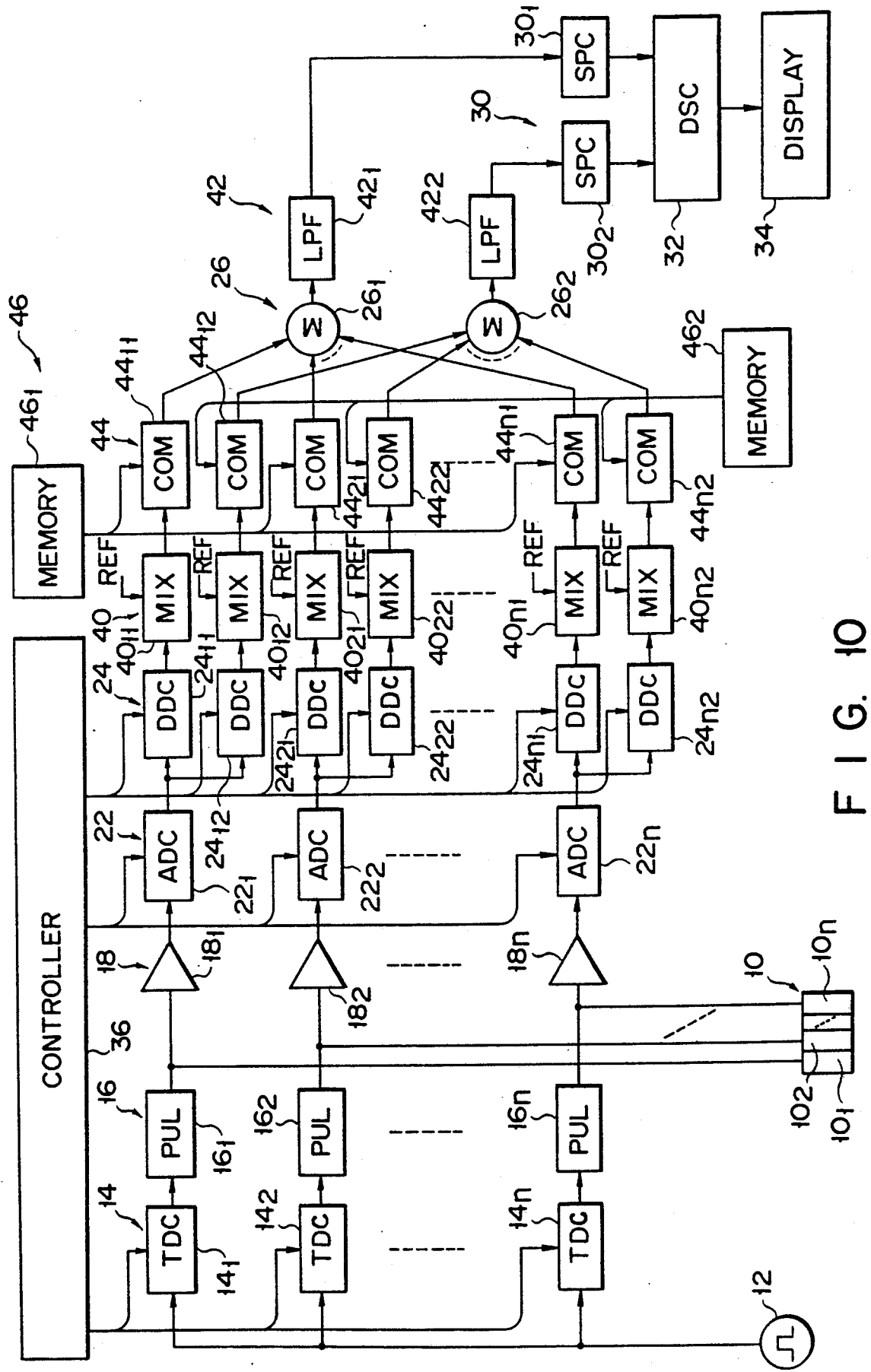
FIG. 10 is a block diagram showing a structure of a medical sector electronic scan type ultrasonic image diagnosis apparatus according to a sixth embodiment of the present invention.

As described above, since variation in characteristics of the respective channels occurs, considerable variation in phase and amplitude appear, in particular, in the heterodyne processing, resulting in degradation in resolution of images or an increase in artifact. Thus, desirable images cannot be obtained. FIG. 10 shows a sixth embodiment of the invention which can solve these problems. The sixth embodiment is an improvement of the embodiment shown in FIG. 8 (or FIG. 9).

The sixth embodiment shown in FIG. 10 differs from the fourth embodiment shown in FIG. 8 in that in the former a compensating section 44 such as a multiplier and a memory section 46 for compensation data are provided at the front stage of the summing section 26.

The compensating section 44 includes an n-number of compensators $44_{11}$ to $44_{n1}$ for real-number parts, and an n-number of compensators $44_{11}$ to $44_{n2}$ for imaginary-number parts. The memory section 46 for compensation data includes a memory $46_1$ for storing compensation data for the real-number parts, and a memory $46_2$ for storing compensation data for the imaginary-number parts.

The compensation data memory section 46 stores echo data (compensation data) supplied through all channels when all transducers are driven with use of a single object under the same conditions, or data for compensating variation between the channels obtained by computer simulation.

Upon receiving the compensation data, the compensation section 44 compensates variation between the channels. In other words, the data stored in the compensation data memory section 46 represents variation between the channels. Thus, in the actual diagnosis, the A/D converted data is compensated by using the data stored in the compensation data memory section 46. As a result, the variation between the channels can be compensated, and real echo data for each channel can be obtained.

As described above, according to the sixth embodiment shown in FIG. 10, in the actual diagnosis, the data representative of the variation between the respective channels are read out from the compensation data memory section 46, and based on this data the A/D converted data can be compensated for the respective channels. Thus, variation between the channels can be compensated, and high-resolution, low-artifact images can be obtained.

Furthermore, since variation between the channels can be compensated, electronic parts having variation in characteristic, such as operational amplifiers, can be used. Thus, this feature serves as an advantage in manufacturing the apparatus of the invention.

Needless to say, the structural feature that the compensation section 44 such as a multiplier and the compensation data memory section 46 are provided at the front stage of the summing section 26 is applicable to the first to fifth embodiments.

Other modifications can be made within the scope of the subject matter of the present invention.

As described above in detail, the present invention can provide an ultrasonic imaging apparatus which can enhance the quantization precision of receiving delay, can perform multi-directional simultaneous reception, and can realize easy manufacturing of the apparatus.

What is claimed is:

1. An ultrasonic imaging apparatus comprising:
   a probe having a plurality of ultrasonic transducers arranged in a plurality of channels;
   transmission means for driving each of said ultrasonic transducers to transmit ultrasonic waves, said transmission means comprising standard signal generating means, transmission delay means, and pulser means;
   reception means connected to said ultrasonic transducers in said probe, for producing receiving signals corresponding to the ultrasonic image, said reception means including an analog circuit for amplifying at least one of said receiving signals;
   analog receiving delay means for continuously delaying receiving signals supplied from said reception means in small steps, each channel of said analog receiving delay means including a plurality of analog delay circuits;
   analog/digital converter means for converting output signals of said analog receiving delay means to digital signals, each channel of said analog/digital converter means including a plurality of analog/digital converters;
   digital receiving delay means including a semiconductor memory element for delaying the digital signals output from said analog/digital converter means, each channel of said digital receiving delay means including a switch means for selecting one of the outputs of said analog/digital converters, and a digital delay circuit for receiving the output of the analog/digital converters selected by said switch means;
   summing means for summing the signals supplied from said digital receiving delay means through the respective channels, said summing means including a plurality of summing circuits for summing data signals read out from said digital receiving delay means at a plurality of various timings;
   imaging means comprising a detector, a signal processing circuit, a digital scan converter, and a display, for detecting the output of the summing means, producing predetermined imaging data based on the output of the detector, and displaying the produced imaging data; and
   control means for controlling at least one of the above-recited means.

2. The apparatus according to claim 1, wherein said summing means comprises compensation means connected to an input side of said summing means for compensating errors in output signals between the respective channels.

3. The apparatus according to claim 1, wherein said analog receiving delay means comprises a coil having a plurality of taps and switch means for selecting one of said taps.

4. The apparatus according to claim 1, wherein said analog receiving delay means comprises a coil, a variable-capacitance diode, and a variable resistor means, wherein the variable-capacitance diode is controlled to continuously vary the capacitance of the diode, and the delay amount is determined by an LC constant of the capacitance of the diode and the inductance of the coil, and the resistance value of the variable resistor is controlled along with the control of the variable-capacitance diode thereby to compensate the variation in characteristic impedance.

5. The apparatus according to claim 2, wherein said compensation means comprises a compensating section and a memory section.

6. An ultrasonic imaging apparatus, comprising:
   a probe having a plurality of ultrasonic transducers arranged in a plurality of channels;

transmission means for driving each of said ultrasonic transducers to transmit ultrasonic waves, said transmission means comprising standard signal generating means, transmission delay means, and pulser means;

reception means connected to said ultrasonic transducers in said probe, for producing receiving signals corresponding to the ultrasonic image, said reception means including an analog circuit for amplifying at least one of said receiving signals;

analog/digital converter means for converting receiving signals supplied from said reception means to digital signals; digital receiving delay means for delaying the output of said analog/digital converter means, each channel of said digital receiving delay means including a plurality of digital delay circuits, said digital delay circuits each comprising a semiconductor memory element;

mixing means comprising a plurality of mixers connected to the digital delay circuits of said digital receiving delay means, for producing two outputs which are obtained by displacing the outputs of the digital receiving delay means by $\pi/2$ phase;

a plurality of summing circuits for summing data signals output from the mixing means at a plurality of various timings, said summing circuits comprising compensation means connected to an input side of said summing circuits for compensating errors in outputs in the respective channels;

imaging means for filtering the outputs of the summing circuits, producing predetermined image data based on the filtered outputs, and displaying the produced image data, said imaging means comprising a filter, a signal processing circuit, a digital scan converter, and a display; and control means for controlling at least one of the above-recited means.

7. The apparatus according to claim 6, wherein said compensation means comprises a compensating section and a memory section.

8. An ultrasonic imaging apparatus, comprising:

a probe having a plurality of ultrasonic transducers arranged in a plurality of channels;

transmission means for driving each of said ultrasonic transducers to transmit ultrasonic waves, said transmission means comprising standard signal generating means, transmission delay means, and pulser means;

reception means connected to said ultrasonic transducers in said probe, for producing receiving signals corresponding to the ultrasonic image, said reception means including an analog circuit for amplifying at least one of said receiving signals;

analog/digital converter means for converting receiving signals supplied from said reception means to digital signals;

mixing means including a plurality of mixers for receiving through each channel an output of the analog/digital converter means, which is divided into two signal components, for producing two outputs which are obtained by displacing the outputs of the digital receiving delay means by $\pi/2$ phase;

digital receiving delay means, including a plurality of digital delay circuits for each channel, for delaying the outputs of the mixing means, said digital delay circuits each comprising a semiconductor memory element;

a plurality of summing circuits for summing data signals read out from the digital receiving delay means at a plurality of various timings, said summing circuits comprising compensation means connected to an input side of said summing circuits for compensating errors in outputs in the respective channels;

imaging means for filtering the outputs of the summing circuits, producing predetermined image data based on the filtered outputs, and displaying the produced image data, said imaging means comprising a filter, a signal processing circuit, a digital scan converter, and a display; and control means for controlling at least one of the above-recited means.

9. The apparatus according to claim 8, wherein said compensation means comprises a compensating section and a memory section.

* * * * *